United States Patent Office 2,876,260
Patented Mar. 3, 1959

2,876,260
PREPARATION OF SYMMETRICAL DISUBSTITUTED UREAS

Earl S. Huyser, New York, N. Y., and William F. Tousignant, Midland, Mich., assignors to The Dow Chemical Company, Midland, Mich., a corporation of Delaware No Drawing. Application August 27, 1956
Serial No. 606,189

12 Claims. (Cl. 260—553)

This invention relates to processes for the preparation of symmetrical N,N-disubstituted ureas having the formula R—NHCONH—R wherein R is a hydrocarbon radical.

Symmetrical disubstituted ureas constitute an old and well known class of compounds having many known uses as chemical intermediates. For instance, they react with formaldehyde to form useful resins. Also, they are useful as curing agents for epoxy resins.

According to the invention, ureas of the above type are produced by heating the appropriate primary amine $RNH_2$, with a 2-aminoethyl carbamate having the formula

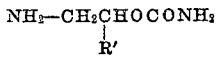

wherein R' is hydrogen or a hydrocarbon radical.

While the mechanism of the reaction involved in our process is unknown, we have found that the identity of the radicals R and R' is not critical. However, lower yields are obtained when R is aryl than when it is alkyl, aralkyl or cycloalkyl. No such difference in result has been observed when R' is similarly varied.

The temperature at which the process is conducted should be in the range of about 120 to 200° C. Below about 120° little or no reaction takes place while above about 200° secondary and side-reactions predominate and little of the desired product is produced. Best results are usually obtained at about 150°. When volatile amines, that is, those boiling below the operating temperature, are used in the process, it is necessary to conduct the reaction in a closed vessel. In such cases, the operating pressure is the autogenous pressure of the reaction mixture. Ammonia is a by-product of the reaction and, unless vented, substantially increases the operating pressure. Some carbon dioxide is also liberated during the reaction and care should be taken that the condenser and vent-line do not become plugged by ammonium carbonate crystals.

The ratio in which the amine and the carbamate are used in the process is not critical. If less than the theoretical ratio of 2:1 is used, some of the product will be the mono- rather than the di-substituted urea. On the other hand, the use of ratios higher than 2:1 increases the yield of the desired product only slightly, and that at the expense of a lower conversion of the amine. Consequently, we generally prefer to use the amine and the carbamate in approximately the theoretical ratio of 2:1.

The practice of the invention is further illustrated by the following examples:

Example 1.—Di-n-butyl urea

Into a 1.5 l. rocking, stainless steel autoclave was charged 104 g. (1.0 m.) of 2-aminoethyl carbamate and 146 g. (2.0 m.) of n-butylamine. The autoclave was then sealed and heated at 150° C. for 4 hrs. After being cooled, the autoclave was opened and the contents were dissolved in 200 ml. of absolute ethanol. After standing overnight at −30° C. the alcoholic solution contained 74 g. of crystalline solid which was filtered out and recrystallized from aqueous alcohol. Yield, 43 percent of theory; M. P., 72 to 73° C.

Example 2.—Di-n-amyl urea

The same autoclave used in Example 1 was charged with 104 g. (1 m.) of 2-aminoethyl carbamate and 174.4 g. (2 m.) of n-amylamine and heated for 6 hrs. at 150° C. The viscous liquid product was then distilled and the fraction boiling at 173 to 175° C. (1.0 mm.) was collected. It amounted to 116.7 g. (58 percent of theory). Elemental and infra-red analyses showed it to be diamyl urea, although it was obtained as a supercooled sirup that could not be crystallized.

Example 3.—Dicyclohexyl urea

Two mols of cyclohexylamine and 1 m. of 2-aminoethyl carbamate were placed in a flask fitted with stirrer and thermometer and were heated at 125 to 150° C. for 4.5 hrs. The mixture was then cooled and 200 ml. of absolute alcohol were added. The mixture was then heated to boiling, chilled in an ice bath and filtered. The solid product could be recrystallized from alcohol, though it was substantially pure as produced. Yield, 58 percent; M. P., 230 to 231° C.

By proceeding substantially as described in Example 3, the results shown in the following table were obtained.

TABLE I.—DISUBSTITUTED UREAS

| Example No. | Amine Used | Carbamate Used | Reaction Time, hrs. | Temperature, ° C. | Yield, Percent | Melting Pt., ° C. |
|---|---|---|---|---|---|---|
| 4 | Benzyl | 2-Aminoethyl | 4 | 180 | 50 | 169-170 |
| 5 | Phenyl | do | 1.5 | 150 | 7 | 236-238 |
| 6 | do | do | 1.5 | 160-188 | 12.5 | 236-238 |
| 7 | do | do | 3.5 | 125-135 | 10 | 236-238 |
| 8 | do | 1-Methyl-2-Aminoethyl | 4 | 150 | 13.2 | 236-238 |
| 9 | Cyclohexyl | do | 4 | 150 | 76 | 230-231 |

Results similar to those shown in the above examples were obtained when other primary amines or other 1-substituted 2-aminoethyl carbamates were substituted for those used in the examples. Since the identity of the carbamate is immaterial insofar as the identity, yield and purity of the disubstituted urea product is concerned, we prefer to use the simplest carbamate of that type, namely, 2-aminoethyl carbamate.

The 2-aminoethyl carbamate used as one of the reactants in the process of the invention may be made by the action of the appropriate ethylene or substituted ethylene oxide on urea at a temperature of about 80 to 150° C. This reaction and several of the 2-aminoethyl carbamates thus obtainable are more fully described in the copending application of one of us (William F. Tousignant) and Thomas Houtman, Jr., filed August 12, 1954, Serial No. 449,477, now Pat. No. 2,842,523. Other 2-aminoethyl carbamates not specifically described therein may be prepared by the same general procedure,

We claim:
1. A process for producing a symmetrical disubstituted urea having the formula R—NHCONH—R, wherein R is a hydrocarbon radical selected from the group consisting of lower alkyl, cycloalkyl, aralkyl and phenyl, comprising heating at about 120 to 200° C. a mixture of a primary amine having the formula $RNH_2$, wherein R has the same significance as above, and at least about two molar equivalents of a 2-aminoethyl carbamate having the formula

$$NH_2-CH_2\underset{\underset{R'}{|}}{C}HOCONH_2$$

wherein R' is a radical selected from the group consisting of hydrogen and lower alkyl radicals, and recovering the thus formed symmetrical disubstituted urea.

2. A process as in claim 1 wherein the carbamate is 2-aminoethyl carbamate.
3. A process as in claim 1 wherein the carbamate is a 1-alkyl-2-aminoethyl carbamate.
4. A process as in claim 1 wherein the carbamate is 1-methyl-2-aminoethyl carbamate.
5. A process as in claim 1 wherein the amine is an alkylamine.
6. A process as in claim 1 wherein the amine is a cycloalkylamine.
7. A process as in claim 1 wherein the amine is an aralkylamine.
8. A process as in claim 1 wherein the amine is butylamine.
9. A process as in claim 1 wherein the amine is amylamine.
10. A process as in claim 1 wherein the amine is cyclohexylamine.
11. A process as in claim 1 wherein the amine is aniline.
12. A process as in claim 1 wherein the amine is benzylamine.

References Cited in the file of this patent
UNITED STATES PATENTS
2,172,747    Bowles et al. _____ Sept. 12, 1939
FOREIGN PATENTS
937,586    Germany _____ Jan. 12, 1956